Sept. 16, 1924.
E. A. HULTS
CALCINING FURNACE
Filed June 24, 1921
1,508,555
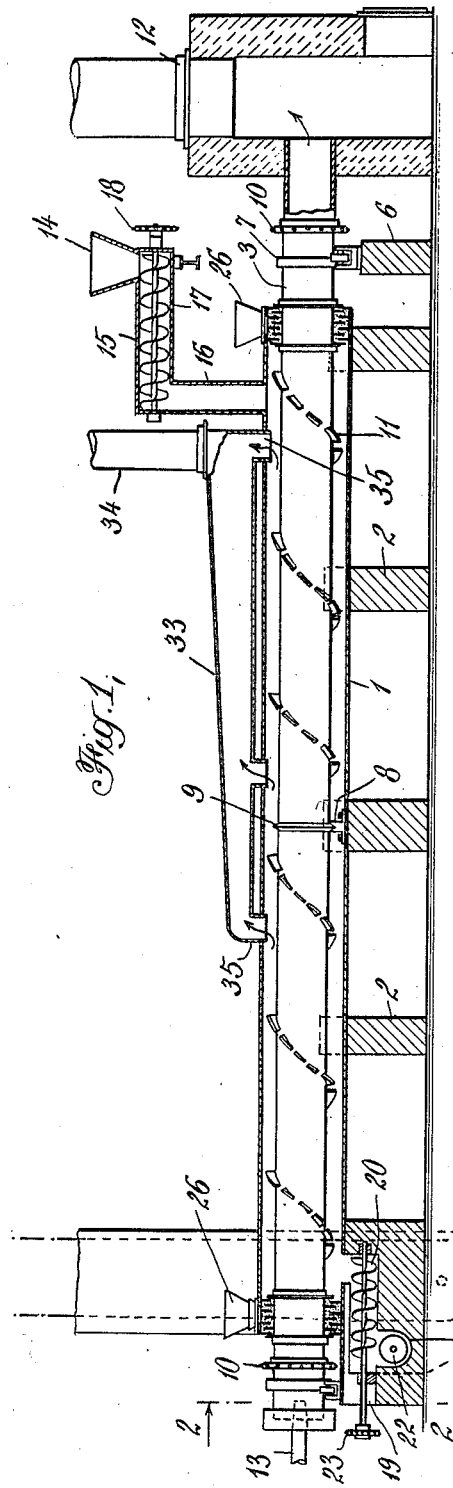
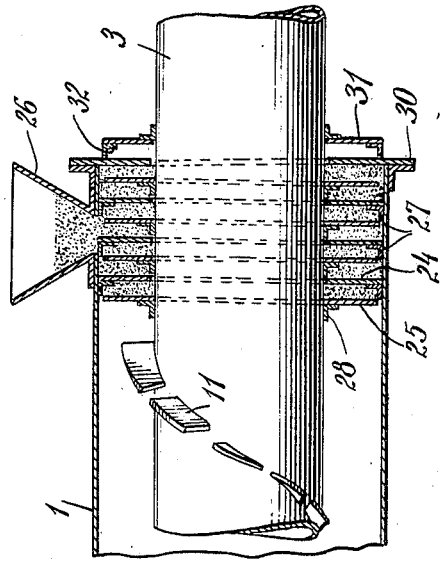
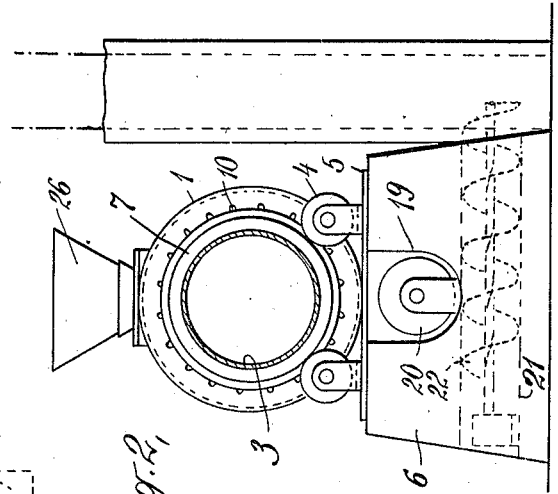
Inventor
E. A. Hults
By his Attorneys
Pennie Davis Marvin & Edmonds Patented Sept. 16, 1924.

1,508,555

UNITED STATES PATENT OFFICE.

EUGENE ARTHUR HULTS, OF SALTVILLE, VIRGINIA, ASSIGNOR TO MATHIESON ALKALI WORKS, A CORPORATION OF NEW YORK.

CALCINING FURNACE.

Application filed June 24, 1921. Serial No. 479,982.

*To all whom it may concern:*

Be it known that I, EUGENE A. HULTS, a citizen of the United States, residing at Saltville, in the county of Smyth, State of Virginia, have invented certain new and useful Improvements in Calcining Furnaces; and I do hereby declare the following to be a full, clear, and exact description of the invention, such as will enable others skilled in the art to which it appertains to make and use the same.

My invention relates to an improved type of calcining furnace adapted particularly for use in the calcining of sodium bicarbonate for the production of soda ash, and for recovery of carbon dioxide in a concentrated state, and with a high yield.

In furnaces of the character in question, which have been heretofore used, where the material is calcined out of direct contact with the heated gases of combustion, a rotatable calcining magazine or container is provided which is externally heated, or which is heated by a central stationary heated tube about which it rotates, the rotation providing a means for agitation, and a means for progressing the material through the furnace.

In either case there is a recovery of only part, e. g. about one-half of the carbon dioxide which theoretically may be recovered, the other half being lost by leakage, while that which is recovered is somewhat diluted with air, or products of combustion. Where the magazine is rotated about a central stationary heated tube, the hot gases follow a more or less fixed path through the central tube, so that the tube is not uniformly heated. Hence the material is not subjected to a uniform heating action throughout its travel, and the heating value of the fuel is not utilized to the best advantage, resulting in an inferior or more costly product.

The improved apparatus comprises essentially a central rotary heating tube, and a stationary outer tube, between which and the inner tube the material to be calcined is passed, the inner tube having means for progressing the material through the outer tube, from the inlet to the outlet end. Producer gas or other suitable fuel, together with air, is supplied to one end of the heating tube adjacent to the outlet end of the outer tube, the other end of the central tube being connected with a stack, and combustion takes place in the inner tube, so that it is heated internally and so that the heat is all obliged to pass through the walls to the surrounding material, except for that which goes up the stack with the flue gases. In the annular space between the tubes, the material to be calcined, as for instance sodium bicarbonate, is fed, the said material being fed at the end adjacent to the stack, and the calcined material is discharged at the other end of said space, suitable means being provided for delivering the calcined material from the furnace.

In the drawings is shown a preferred embodiment of the invention, wherein—

Fig. 1 is a central longitudinal section;

Fig. 2 is a section on line 2—2 of Fig. 1; and

Fig. 3 is an enlarged sectional detail of the inlet end of the furnace, showing the labyrinth.

In the present embodiment of the invention, the improved furnace comprises a fixed outer tube 1, which is supported by suitable pedestals 2, and an inner tube 3, which is mounted to rotate within the outer tube, being arranged coaxially therewith. The inner tube is supported by rollers 4 which are journaled on brackets 5 supported by pedestals 6, and the tube has track rings 7 which run upon the wheels. The rollers 4 are arranged at the ends of the tube and intermediate its ends it is supported by a bracket 8 having a V-shaped groove, which is engaged by a similarly shaped ring 9 on the tube. The tube 3 is rotated by any suitable motor, connected to the tube by means of sprocket chains, not shown, which engage sprocket wheels 10 on the tube. The inner tube is also provided with a series of spirally arranged blades or vanes 11, the said blades being spaced slightly from each other, and being designed to progress the material through the annular space between the tubes. One end of the tube 3 is connected with a suitable stack 12, and at the other end there is provided means indicated at 13 for supplying gas and air to the tube, to be burned therein, for heating the same.

The material to be calcined is fed to the tube 1 at the end adjacent to the stack, by means of a hopper 14 or the like. This hopper has a horizontal outlet 15, which connects with the tube 1 by means of a pipe 16, and a screw conveyor 17 is arranged within the outlet 15, the conveyor being rotated by means of a sprocket wheel 18 connected therewith. At the opposite end the calcined material is delivered to an outlet pipe 19, having a screw conveyor 20, and the conveyor delivers to a discharge chute 21, which is also provided with a screw conveyor 22, and which delivers the material to a suitable place of storage. The conveyor 20 is provided with a sprocket wheel 23, by means of which it may be driven, to pass the material from the tube 1 to the chute 21. The material being fed to and removed from the furnace seals the inlet and outlet from inflow of air or escape of gas therethrough.

In order to seal the space between the tubes at the ends thereof, labyrinths are provided, each labyrinth consisting of a series of flanges or rings 24, on the tube 1, and another series 25 on the tube 3, the members of the series 24 alternating with the members of the series 25. The space between the flanges is filled with finely divided soda ash or bicarbonate, which is supplied from a hopper 26 arranged on the tube 1 at the labyrinth and opening into the tube. Referring to Fig. 3, it will be seen that each ring 24 has an angle ring 27 at its outer edge, the free edge of the angle ring extending near to the adjacent face of the adjacent ring 25, and these rings 27 connect the rings 24 to the tube 1. The flanges 25 are held by angle rings 28, which are secured to the tube 3. A ring 30 is secured to each end of the tube 1, and outside of each ring 30 a ring 31 is secured to the tube 3. Each ring 31 has an angle ring 32 at its free edge, and the free edge of each angle ring extends to near the adjacent ring 30. The labyrinths provide a secure seal at each end of the annular space between the tubes to prevent the escape of carbon dioxide. The flanges or rings 25 on the tube 3, are set at such an angle, that when the tube is rotated, the particles of material which form the seal will leak toward the inside of the furnace, and not toward the outside. A means is provided for carrying off the carbon dioxide, the said means comprising a pipe 33, extending longitudinally of the tube 1 above the same, and opening into a flue 34. The pipe 33 gradually increases in cross section toward the flue, and it has a number of inlets 35 which open into the tube 1. These inlets 35 being arranged at different points in the tube 1, permit the carbon dioxide to be drawn off from different locations, and from near the place where it is driven off. The inlets are of relatively large size, so that the gas escapes with a moderate velocity, and carries very little of the fine sodium carbonate with it. As a result, the problem of recovering this fine dust from the escaping gases is greatly simplified. Since there is no pressure or vacuum in the furnace, a loss which would ordinarily occur is eliminated.

In operation, the material to be calcined is fed to the hopper 14, it being understood that the tube 3 is heated to a suitable temperature. As the tube 3 rotates, the blades or vanes 11 move the material gradually through the tube 1, from the inlet to the discharge end, and it will be noticed that the material travels in the opposite direction to the gases of combustion. The blades or vanes 11 on the tube 3, gently break up and distribute the bicarbonate, so that every particle of the material is subjected to substantially the same amount of heat, that is the vanes thoroughly stir and mix the material as they pass it through the tube 1. Since the tube 3 is rotating, every part thereof will be uniformly heated, obtaining thus a better article, at a reduced cost for fuel. The calcined material is discharged by the screw conveyors 20 and 22 to a suitable place of storage, while the carbon dioxide is carried away by means of pipe 33. The gas is driven off in a concentrated state, and is recovered in practically the theoretical yield, without dilution with any considerable amount of air, or other gases, and without loss during calcination. A high yield of concentrated carbon dioxide gas is thus obtained.

In the ammonia soda process, carbon dioxide is required for the carbonating towers, and this is usually supplied by burning limestone. The carbon dioxide recovered from the calcining of the bicarbonate, to produce a normal carbonate, is available for reuse, and to the extent that it is available, it makes unnecessary the production of a corresponding amount of carbon dioxide from the lime kiln, while the recovery of the carbon dioxide gases in a concentrated state makes it possible to mix these gases with a further amount of gases from the lime kilns, and gives a resulting mixture of regulated dioxide content for use in carrying out the ammonia soda process.

The movement of the material by the blades, will provide agitation and will insure a uniform heating throughout its travel. The temperature required for calcining sodium bicarbonate to make soda ash, is only about 250° C. The temperature at the discharge end, where the gases are hottest in the central heating tube, may be much higher than that required for the calcining, but this is unobjectionable provided the temperature does not rise too high to cause melting of the soda ash. Some sintering and resulting densification of the soda ash may be desirable where a dense product is to be produced. The temperature will naturally fall from the combustion end of the central tube to the outlet end and the sodium carbonate surrounding the heating tube will be progressively heated from the inlet to the discharge end. As a result the evolution of the carbon dioxide will take place progressively while the continued stirring and agitation of the material and its continued heating by the central heating tube will result in substantially complete calcination as material is progressed through the annular space surrounding the heating and outer tubes.

The regulation of the process is effected by regulating the supply of heat at the combustion end of the heating tube and by regulating the amount of sodium bicarbonate supplied to the apparatus and its rate of flow through the apparatus. The character of the soda ash discharged from the apparatus gives an indication of whether the calcination has been complete.

In the ordinary rotary calcining furnace, there is a considerable carrying over of fine particles of the sodium carbonate or bicarbonate which must be recovered from the escaping gases. This dusting or carrying over of fine particles is largely prevented by the present apparatus.

It will be noted that the outlets for the carbon dioxide gas are separate and apart from the inlet or exit for the solid material, so that the gas escapes without passing through the solid material, while the solid material seals the inlet and outlet and prevents escape of the gas therethrough as well as leaking in of air to dilute the gas.

While the apparatus forming the subject-matter of the present invention is of special advantage in the calcining of sodium bicarbonate, it is obvious that its use is not limited to this particular material.

It will be understood that the gases after leaving the internal or heating tube may be used for heating purposes in any capacity desired. These gases may go either to a stack of exhaust fan. The heat furnished the inner tube 3 can be either in the form of combustion directly in the entrance end of the tube, or in a combustion chamber at the entrance end, the arrangement being such that the hot gases only flow through the tube 3. The heating tube 3 may be of plain material as shown, or it may be corrugated, the latter construction giving greater heating surface. The mounting of the inner tube in the manner described permits expansion and contraction due to temperature changes, without interference with the mounting of the tube and its rotation. The tube at its center is prevented from longitudanl movement, by the V-shaped ring or groove, while the ends of the tube are free to move longitudinally, the plain ring 7 being designed to move along the rollers 4. This mounting permits a certain amount of end play of the inner tube, but limits such end play. Any other suitable form of mounting might be provided, that would serve the same purpose.

I claim:—

1. A calcining furnace comprising a receiving tube, a heating tube mounted to rotate, within the receiving tube, means operated by the rotation of the heating tube for moving the material longitudinally of the receiving tube, and a plurality of means for conducting the gases away from the receiving tube, said receiving tube being otherwise sealed to prevent dilution of said gases.

2. A calcining furnace, comprising a receiving tube, a heating tube mounted to rotate within the receiving tube, means operated by the rotation of the heating tube for progressing the material longitudinally of the receiving tube, and a plurality of means for conducting the gases away from said receiving tube, said means being arranged at intervals in the length of the said tube, said tube being otherwise sealed to prevent the dilution of the gases.

3. A calcining furnace, comprising a receiving tube, a heating tube mounted to rotate within the receiving tube, means operated by the rotation of the heating tube for moving the material longitudinally of the receiving tube, said receiving tube having means for conducting the gases away from said tube, and said conducting means gradually increasing in capacity from the receiving tube.

4. A calcining furnace comprising a receiving tube, a heating tube mounted to rotate within the receiving tube, means operated by the rotation of the heating tube for moving the material longitudinally of the receiving tube, said receiving tube having outlets for the gas spaced longitudinally thereof, and a common collector pipe to which the outlets deliver, said receiving tube being otherwise sealed to prevent the dilution of the gas.

5. A calcining furnace, comprising a receiving tube, a heating tube mounted to rotate within the receiving tube, means operated by the rotation of the heating tube for moving the material longitudinally of the receiving tube, and means for circulating hot gases through the heating tube in the opposite direction to the travel of the material, said receiving tube being arranged so as to provide a sealed chamber having a plurality of outlets therefrom.

6. A calcining furnace, comprising a receiving tube, a heating tube mounted to rotate within the receiving tube, means operated by the rotation of the heating tube for moving the material longitudinally of the receiving tube, means for circulating hot gases through the heating tube in the opposite direction to the travel of the material, the receiving tube having a plurality of outlets spaced longitudinally thereof for the gases, and a common collector pipe for the outlets, said receiving tube being otherwise sealed whereby to prevent the dilution of the gases.

7. A calcining furnace, comprising a pair of coaxial tubes, means for feeding the material to be calcined to one end of the outer tube, means for delivering calcined material from the other end, the inner tube being rotatable, and having means for progressing the material from the inlet to the outlet end of the outer tube, means for circulating hot gases through the inner tube to heat the same, means at each end of the outer tube for sealing the space between the tubes, said means comprising labyrinths, and means for feeding the material to be calcined in a finely divided state to the labyrinths.

8. A calcining furnace, comprising a receiving tube, a heating tube mounted to rotate within the receiving tube, means operated by the rotation of the heating tube for moving the material longitudinally of the receiving tube, means for circulating hot gases through the heating tube in the opposite direction to the travel of the material, and labyrinths arranged between the tubes at the ends thereof, means for feeding finely powdered material to the labyrinths, said labyrinths comprising rings on the tubes alternating with each other, the rings on the inner tube being inclined to feed the material inwardly.

In testimony whereof I affix my signature.

EUGENE ARTHUR HULTS.